(12) United States Patent
Muta et al.

(10) Patent No.: US 11,760,250 B2
(45) Date of Patent: Sep. 19, 2023

(54) VEHICLE FLOOR STRUCTURE

(71) Applicant: TOYOTA JIDOSHA KABUSHIKI KAISHA, Toyota (JP)

(72) Inventors: Masahiro Muta, Toyota (JP); Soshiro Murata, Toyota (JP); Ayaka Kagami, Inazawa (JP); Yasuhide Matsuo, Toyota (JP); Ken Atsuta, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/580,201

(22) Filed: Jan. 20, 2022

(65) Prior Publication Data

US 2022/0266736 A1 Aug. 25, 2022

(30) Foreign Application Priority Data

Feb. 24, 2021 (JP) ................................. 2021-027122

(51) Int. Cl.
B60P 1/43 (2006.01)
(52) U.S. Cl.
CPC ............... B60P 1/433 (2013.01); B60P 1/431 (2013.01); B60P 1/435 (2013.01)
(58) Field of Classification Search
CPC ..................................................... B60P 1/433
See application file for complete search history.

(56) References Cited

U.S. PATENT DOCUMENTS

| 5,915,773 A | * | 6/1999 | Deutsch | B60P 1/433 296/26.1 |
| 7,488,025 B1 | * | 2/2009 | Roberson | B60P 1/433 296/61 |
| 8,397,329 B2 | * | 3/2013 | Just | A61G 3/067 14/73.1 |
| 9,126,522 B1 | * | 9/2015 | Perez | B60P 1/433 |
| 9,862,298 B2 | * | 1/2018 | Bushek | B60P 1/43 |

FOREIGN PATENT DOCUMENTS

| JP | H10-316053 A | 12/1993 |
| JP | H08-268344 A | 10/1996 |
| JP | 2019-015099 A | 1/2019 |

* cited by examiner

Primary Examiner — Jonathan Snelting
(74) Attorney, Agent, or Firm — Dinsmore & Shohl LLP

(57) ABSTRACT

A vehicle floor structure includes a floor member having an opening and a floor panel covering the opening. The floor panel is configured by sequentially arranging and integrating a plurality of kinds of unit panels in a lateral direction of the unit panels, the unit panels having rectangular shapes as viewed from above a vehicle. Two end sides of the floor panel extending along a direction in which the unit panels are arranged (x direction) and one side of at least one of two unit panels arranged at opposite ends of the floor panel are supported by support portions of a floor member. A unit panel of which the one side is supported by the support portion of the floor member has a lighter weight per unit area than other unit panels having lateral lengths equal to or greater than a lateral length of the unit panel.

9 Claims, 8 Drawing Sheets

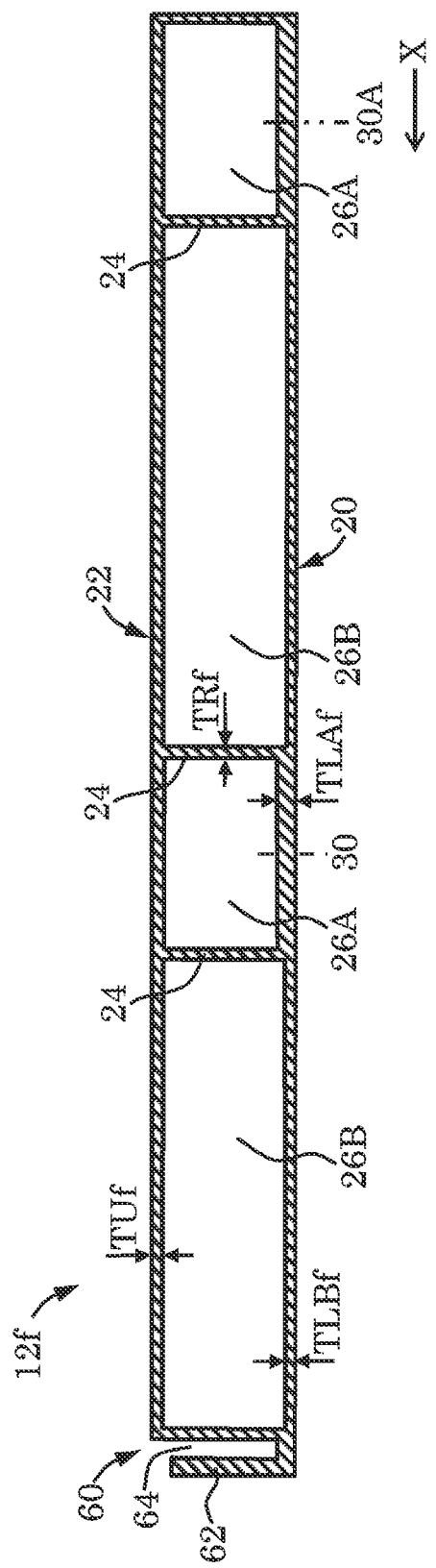

VEHICLE FLOOR STRUCTURE

CROSS-REFERENCE TO RELATED APPLICATION

This application claims priority to Japanese Patent Application No. 2021-027122 filed on Feb. 24, 2021, incorporated herein by reference in its entirety.

BACKGROUND

1. Technical Field

The present disclosure relates to a vehicle floor structure, particularly a floor panel covering an opening included in a floor.

2. Description of Related Art

Conventionally, various materials have been known as a floor material for a vehicle, and Japanese Unexamined Patent Application Publication No. 10-316053 (JP 10-316053 A) discloses, as a floor structure for a truck, a floor structure for which an extruded aluminum material is used. A rib and the like that extend along an extrusion direction is easily formed using the extruded aluminum material. According to JP 10-316053 A, providing the rib on a surface of the floor material effectively reduces a possibility of slippage on the floor material.

SUMMARY

Some vehicles are provided with a floor panel that covers an opening included in a floor, and the floor panel bends when a person or the like gets on it, so that a lower surface of the floor panel may interfere with vehicle-mounted objects such as an ascending/descending ramp disposed in the opening. By increasing a thickness of the floor panel, for example, to increase its strength, it is possible to reduce bending of the floor panel as described above, but the floor panel becomes heavier by the amount of the increased strength.

Therefore, it is desired to reduce the weight of the floor panel while reducing the bending of the floor panel when a load is applied from above the floor panel.

A vehicle floor structure according to the present disclosure includes a floor member including an opening, and a floor panel covering the opening. The floor panel is configured by sequentially arranging and integrating a plurality of kinds of unit panels in a lateral direction of the unit panels, the unit panels having rectangular shapes as viewed from above a vehicle. Two end sides of the floor panel extending along a direction in which the unit panels are arranged and one side of at least one of two unit panels arranged at opposite ends of the floor panel are supported by the floor member. A unit panel of which the one side is supported by the floor member has a lighter weight per unit area than other unit panels having lateral lengths equal to or greater than a lateral length of the unit panel.

According to this configuration, the weight of the entire floor panel can be reduced because the strength of the unit panel of which the one side is supported by the floor member, the unit panel being less likely to bend when a load is applied from above the floor panel, is reduced and the weight thereof per unit area is reduced as compared with the other unit panels having the lateral lengths equal to or greater than the lateral length of the unit panel (the unit panels that are likely to bend).

With the vehicle floor structure according to the present disclosure, one side of another of the two unit panels arranged at the opposite ends of the floor panel may be a free side that is not supported by the floor member.

With the vehicle floor structure according to the present disclosure, the unit panel of which the one side is supported by the floor member may have a lighter weight per unit area than the unit panel including the free side.

With the vehicle floor structure according to the present disclosure, each unit panel may have a hollow plate shape and include ribs that extend in a longitudinal direction of the unit panel inside the unit panel and connect an upper wall and a lower wall of a hollow cross section.

With the vehicle floor structure according to the present disclosure, the unit panel of which the one side is supported by the floor member may have a small number of the ribs per unit length in the lateral direction as compared with the other unit panels having the lateral lengths equal to or greater than the lateral length of the unit panel.

With the vehicle floor structure according to the present disclosure, a rib included in the unit panel of which the one side is supported by the floor member may be thinner in the lateral direction of the unit panel than ribs of the other unit panels having the lateral lengths equal to or greater than the lateral length of the unit panel.

With the vehicle floor structure according to the present disclosure, each unit panel may have a hollow plate shape and include ribs that extend in a longitudinal direction of the unit panel inside the unit panel and connect an upper wall and a lower wall of a hollow cross section, and a rib of the unit panel of which the one side is supported by the floor member may be thinner in the lateral direction of the unit panel than a rib of the unit panel including the free side.

With the vehicle floor structure according to the present disclosure, an inner side of the hollow cross section of each unit panel may be divided into a plurality of chambers by one or more of the ribs, the chambers may include a fastening chamber that includes the lower wall fastened to the floor member at longitudinal ends of the unit panel and an unfastening chamber that includes the lower wall that is not fastened to the floor member, and the lower wall of the unfastening chamber may be thinner in a vehicle up-down direction than the lower wall of the fastening chamber.

With the vehicle floor structure according to the present disclosure, each unit panel may be made of aluminum.

According to the present disclosure, it is possible to reduce the weight of the floor panel while reducing bending of the floor panel when a load is applied from above the floor panel.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 8 is a diagram showing a detailed cross section of a unit panel 12f that is located in the rightmost position and of which one side is supported by a floor member.

DETAILED DESCRIPTION OF EMBODIMENTS

Hereinafter, an embodiment of the present disclosure will be described with reference to the drawings. The present disclosure is not limited to the embodiment described below. In the following description, unless otherwise specified, the terms indicating the front-rear, right-left, and up-down, etc. directions indicate the directions related to a vehicle. In each figure, the direction of the arrow FR indicates a forward direction, the direction of the arrow UP indicates an upward direction, and the direction of the arrow LH indicates a leftward direction.

Figure 1:
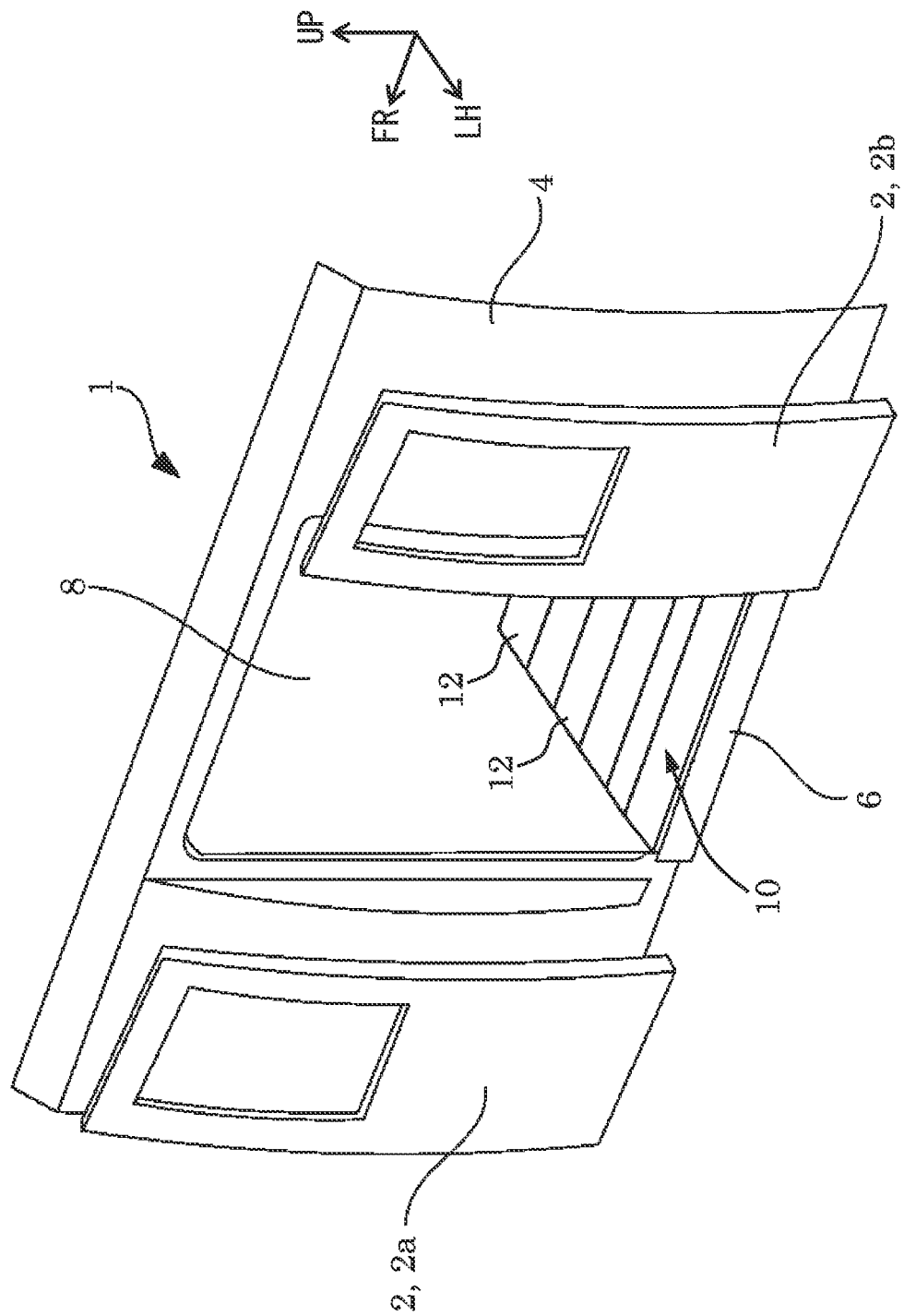
FIG. 1 is a perspective view showing a configuration of a surrounding area of an entrance of a vehicle 1, and shows a state in which an ascending/descending ramp for a wheelchair and the like is folded up.
Figure 2:
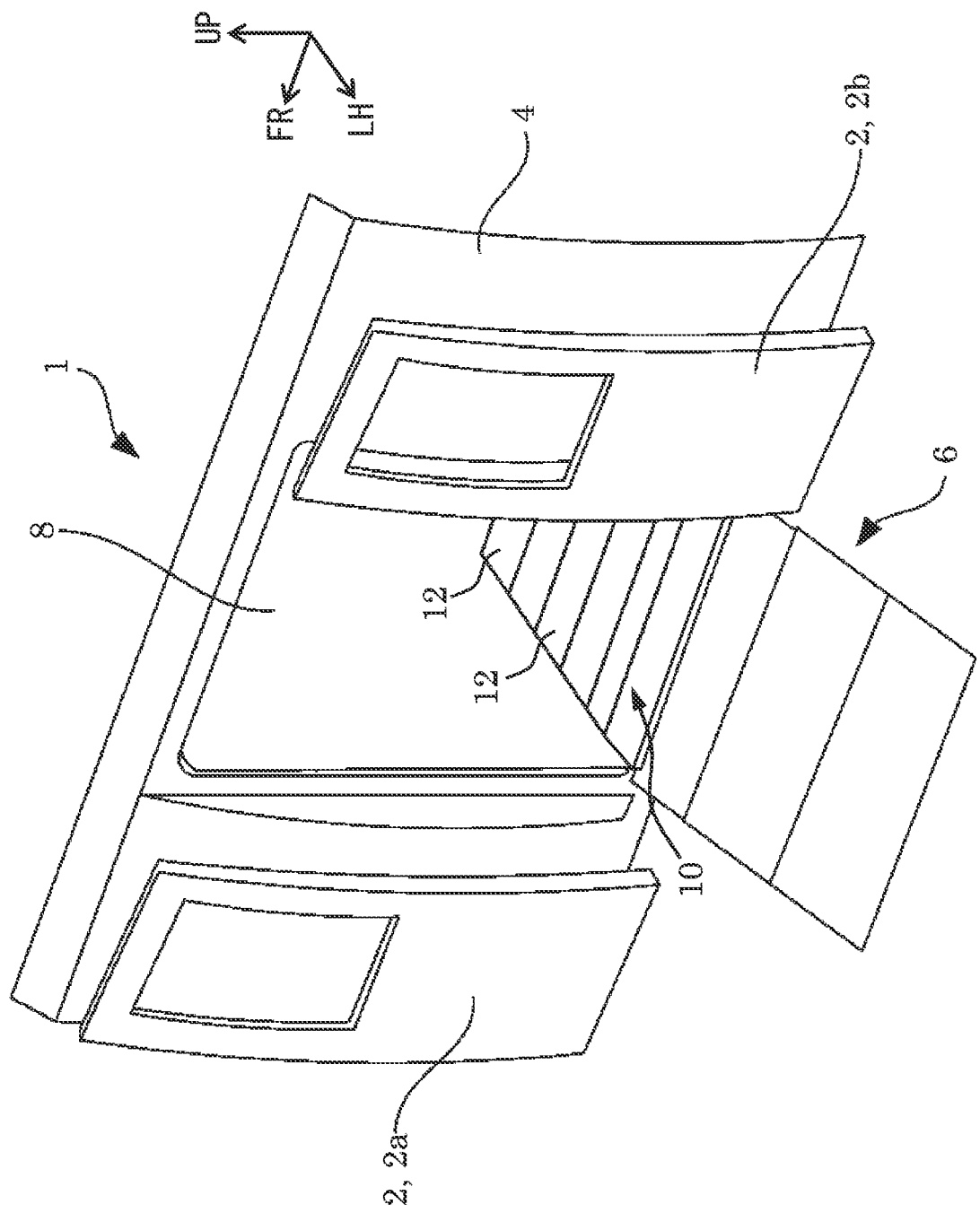
FIG. 2 is a perspective view showing the configuration of the surrounding area of the entrance of the vehicle 1, and shows a state in which the ascending/descending ramp is opened out.

FIGS. 1 and 2 are perspective views each showing a configuration of a surrounding area of an entrance of a vehicle 1. FIG. 1 shows a state in which a ramp is folded up, and FIG. 2 shows a state in which the ramp is opened out. A vehicle body 4 includes a sliding door 2 on a left side surface of the vehicle body 4. The left side surface is one side surface of the vehicle body 4. Electric-powered ramp equipment 6 is provided under the sliding door 2 of the vehicle body 4. The electric-powered ramp equipment 6 includes a ramp for facilitating egress and ingress of a wheelchair or the like.

The sliding door 2 includes two doors 2a and 2b (a front side is the door 2a and a rear side is the door 2b), and these sliding doors 2a and 2b open and close an entrance 8 by sliding in opposite directions along a front-rear direction by a door opening/closing mechanism (not shown).

Further, in the electric-powered ramp equipment 6, the ramp is folded up under a floor in normal times as shown in FIG. 1, and when the ramp is used for egress and ingress, the ramp is opened out so as to protrude outward (diagonally to the left in FIG. 2) as shown in FIG. 2.

A floor panel 10 is disposed above a portion where the electric-powered ramp equipment 6 is disposed. The floor panel 10 is provided as a separate member from floor panels of other portions of the vehicle 1, and can be removed independently. As a result, for example, with the floor panel 10 removed, it is possible to perform operations such as inspection, repair, and removal of the electric-powered ramp equipment 6 that is provided under the floor panel 10. A weight of the floor panel 10 is reduced such that the floor panel 10 can be easily removed, as described below.

Figure 3:
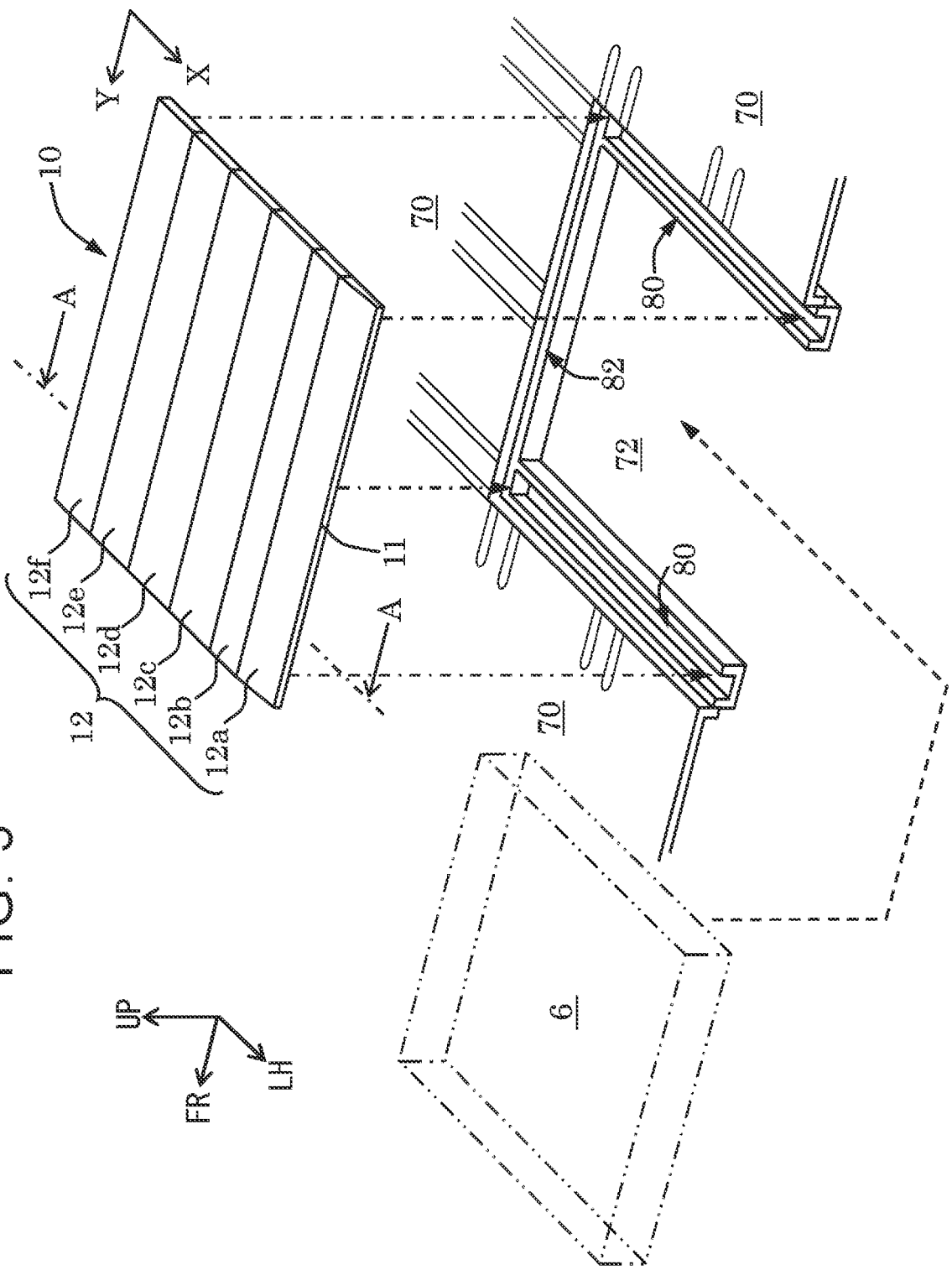
FIG. 3 is an exploded perspective view showing a structure for attaching a floor panel 10 to a vehicle.

FIG. 3 is a diagram showing a structure for attaching the floor panel 10 to the vehicle. A floor member 70 made of iron or the like is provided on the floor of the vehicle, and an opening 72 that is open at a position corresponding to the entrance on the side of the vehicle is provided in the floor member 70. Two support portions 80 and one support portion 82 for supporting the floor panel 10 are provided on peripheral edges (three sides) of the opening 72. The support portions 80 and 82 are a part of the floor member 70. The two support portions 80 extend in the right-left direction so as to be spaced from each other in the front-rear direction, and the support portion 82 extends in the front-rear direction so as to be connected to the right end of each of the two support portions 80. The electric-powered ramp equipment 6 is disposed on the inner side of the support portions 80 and 82, and the floor panel 10 is disposed so as to cover the electric-powered ramp equipment 6. Peripheral edges of three sides of the floor panel 10 are placed on the support portions 80 and 82 and fixed by bolt tightening (not shown) or the like.

The floor panel 10 covers the opening 72, and one side of the floor panel 10 corresponding to the entrance is a free side 11 under which a support member is not provided. An interior material such as a cover material may be installed as appropriate on an upper side of the floor member 70 and the floor panel 10.

The floor panel 10 is configured by sequentially arranging and integrating unit panels 12a to 12f in the lateral direction thereof. The unit panels 12a to 12f have rectangular shapes as viewed from above the vehicle. In this embodiment, the lengths of the unit panels 12a to 12f in the longitudinal direction are the same. Hereinafter, the direction in which the unit panels 12a to 12f are arranged is referred to as the X direction, and the direction orthogonal to the X direction (the direction along the side of each unit panel 12a to 12f) is referred to as the Y direction.

Figure 4:
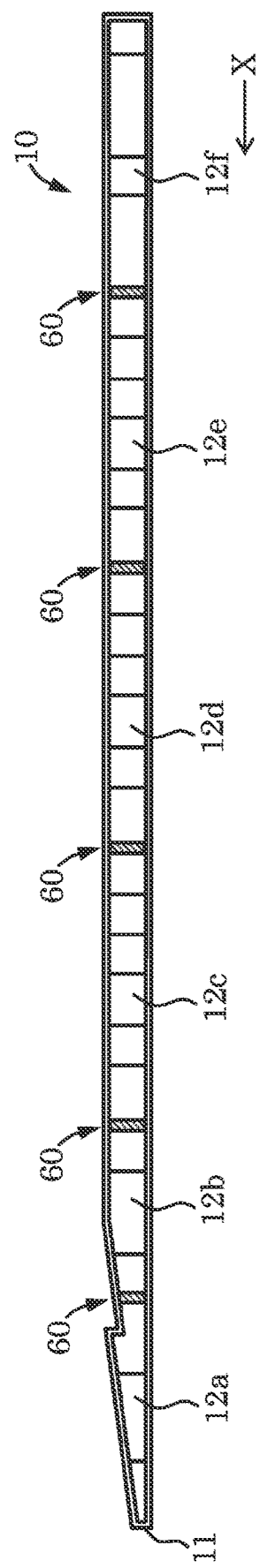
FIG. 4 is a schematic cross-sectional view of the floor panel 10 (a view showing a cross section taken along line A-A of FIG. 3)
Figure 5:
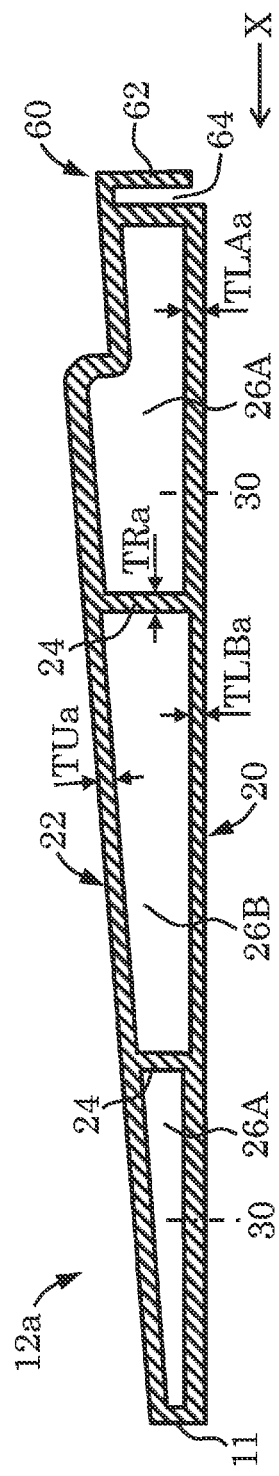
FIG. 5 is a diagram showing a detailed cross section of a unit panel 12a located in the leftmost position.
Figure 6:
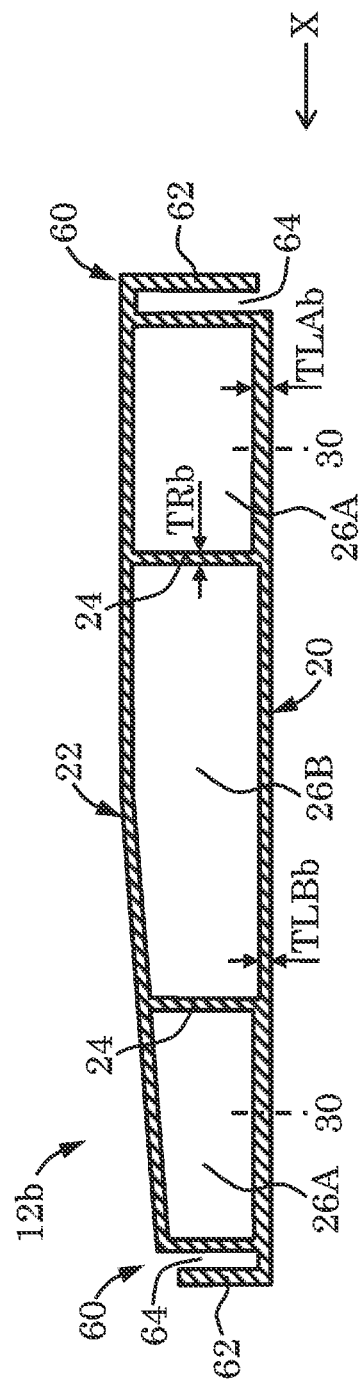
FIG. 6 is a diagram showing a detailed cross section of a unit panel 12b located in the second position from the left.
Figure 7:
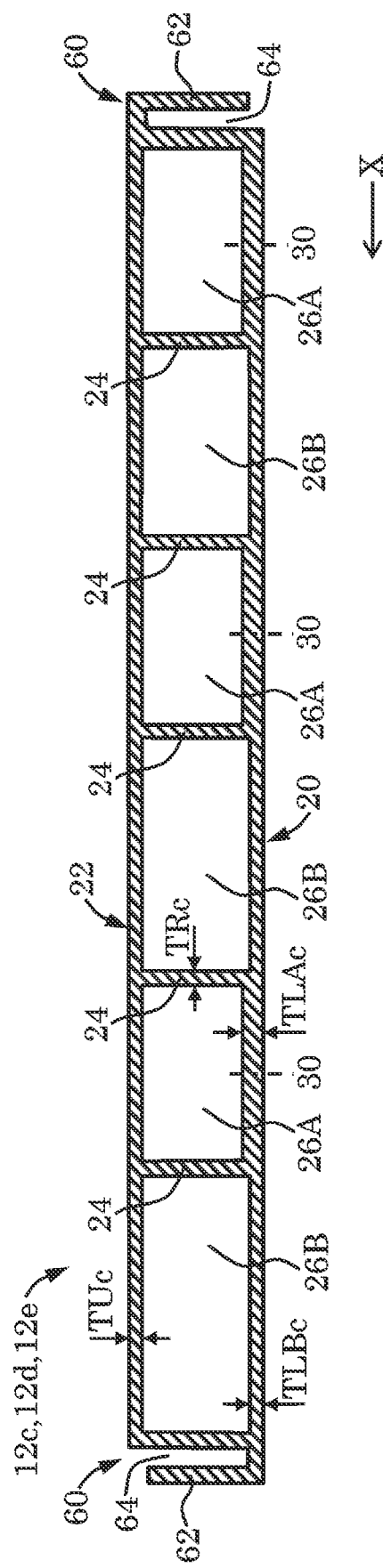
FIG. 7 is a diagram showing a detailed cross section of unit panels 12c, 12d, and 12e located in the third, fourth, and fifth positions from the left, respectively.

FIG. 4 is a schematic cross-sectional view of the floor panel 10 taken along line A-A of FIG. 3. FIG. 5 is a diagram showing a detailed cross section of the unit panel 12a located in the leftmost position. FIG. 6 is a diagram showing a detailed cross section of the unit panel 12b located in the second position from the left. FIG. 7 is a diagram showing a detailed cross section of the unit panels 12c, 12d, and 12e located in the third, fourth, and fifth positions from the left, respectively. FIG. 8 is a diagram showing a detailed cross section of the unit panel 12f that is located in the rightmost position and of which one side is supported by the support portion 82. As shown in FIGS. 4 to 8, the floor panel 10 includes a plurality of kinds of the unit panels 12a to 12f having different structures. Although the unit panels 12c, 12d, and 12e have the same structure, the other unit panels 12a, 12b, and 12f have different structures. An upper wall 22 of the unit panel 12a extends diagonally upward from the free side 11 toward the right side of the floor panel 10 in the X direction (the right side of the unit panel 12a) in order to facilitate egress and ingress of the wheelchair or the like. With regard to a length of each unit panel 12a to 12f in the lateral direction, the unit panel 12c (12d, 12e) is the longest. The length of each unit panel 12a, 12b, and 12f in the lateral direction is shortened in the order of the unit panel 12f, the unit panel 12a, and the unit panel 12b. In the following, when it is not necessary to distinguish each unit panel 12a to 12f, each unit panel 12a to 12f is referred to as a unit panel 12.

The unit panel 12 has a hollow plate shape, and both ends thereof in the longitudinal direction are open. The unit panel 12 includes a plurality of ribs 24 extending in the longitudinal direction inside a hollow cross section and connecting the upper wall 22 and a lower wall 20 of the hollow cross section. When the ribs 24 are provided as described above, the strength of the unit panel 12 in the longitudinal direction is increased. In this embodiment, the thickness of each rib 24 included in the unit panel (thickness of the rib in the lateral direction of the unit panel) is the same in each of the unit panels 12a to 12f.

The unit panel 12 is formed by aluminum extrusion forming in which the longitudinal direction thereof is the extrusion direction. In the aluminum extrusion forming, the aluminum material is pressed toward a mold and extruded from the mold. Therefore, it is easy to form ribs and the like in the extrusion direction, and it is easy to increase strength against bending in the extrusion direction. A direction perpendicular to a surface of the drawings in FIGS. 5 to 8 is the longitudinal direction (extrusion direction), and the same cross-sectional shapes are maintained in the longitudinal direction.

The unit panel 12 includes a connector portion 60 on the side portion thereof. The leftmost unit panel 12a includes a connector portion 60 only on the right side thereof, each of the unit panels 12b to 12e on the middle side includes a connector portion 60 on both right and left sides of each of the unit panels 12b to 12e, respectively, and the rightmost unit panel 12f includes a connector portion 60 only on the left side thereof. The connector portion 60 is composed of an insertion hook 62 and a hook receiving groove 64. The insertion hook 62 of the unit panel 12 is inserted into the hook receiving groove 64 of the adjacent unit panel 12, the insertion hooks 62 mesh with each other, and the two unit panels 12 engage with each other. The unit panels 12a to 12f are sequentially engaged as described above, so that the floor panel 10 is provided. A configuration may be adopted in which a claw is provided at the tip of the insertion hook 62, a recess corresponding to the claw is provided in the hook receiving groove 64, and the claw engages with the recess when the insertion hook 62 is inserted into the hook receiving groove 64, so that the integrated two unit panels 12 are suppressed from being unintentionally disengaged.

Both ends of each unit panel 12a to 12f in the longitudinal direction (two side ends of the floor panel 10 extending along the X direction) are supported by each of the two support portions 80 of the floor member 70 and are fastened to each of the support portions 80 by bolt tightening or the like at fastening positions 30 in the lateral direction (right-left direction in the figure), which is shown in FIGS. 5 to 8. Further, the right side of the rightmost unit panel 12f is supported by the support portion 82 of the floor member 70 and fastened to the support portion 82 by bolt tightening or the like at fastening positions 30A in the lateral direction, which is shown in FIG. 8, and the fastening positions 30A are spaced in the Y direction.

The inner side of the hollow cross section of each unit panel 12 is divided into a plurality of chambers 26A and 26B by the ribs 24. Here, a reference sign 26A indicates a chamber that includes the lower wall 20 fastened to the support portion 80 or the support portion 82 of the floor member 70 (hereinafter referred to as a fastening chamber 26A), and a reference sign 26B indicates a chamber that includes the lower wall 20 that is not fastened to any of the support portion 80 and the support portion 82 of the floor member 70 (hereinafter referred to as an unfastening chamber 26B).

In each of the unit panels 12a to 12f, as shown in FIGS. 5 to 8, each of the vertical thicknesses $TLBa$ to $TLBf$ of the lower wall 20 of the unfastening chamber 26B is thin as compared with each of the vertical thicknesses $TLAa$ to $TLAf$ of the lower wall 20 of the fastening chamber 26A (in FIGS. 5 to 8, a relationship of $TLBa<TLAa$, $TLBb<TLAb$, $TLBc<TLAc$, and $TLBf<TLAf$ is established). The vertical thicknesses of the lower walls 20 of the fastening chambers 26A included in the same unit panel 12 are the same, and similarly, the vertical thicknesses of the lower walls 20 of the unfastening chambers 26B included in the same unit panel 12 are the same. When a load is applied from above the floor panel 10, the floor panel 10 slightly bends, the peripheral edge thereof is slightly lifted, and force may be concentrated on the fastening portion between the support portions 80 and 82 of the floor member 70 and the floor panel 10. As described above, by increasing the thickness of the lower wall 20 of the fastening chamber 26A (the lower wall of the fastening portion), it is possible to suppress deformation of the lower wall 20 when the force is concentrated on the fastening portion. On the other hand, by reducing the thickness of the lower wall 20 of the unfastening chamber 26B, the lower wall 20 being not required to be strong as compared with the lower wall 20 of the fastening chamber 26A, and not providing excessive reinforcement for the lower wall 20 of the unfastening chamber 26B, it is possible to reduce the weight of each unit panel 12.

Further, the unit panel 12f of which the right side is supported by the support portion 82 of the floor member 70 is less likely to bend when a load is applied from above the floor panel 10, as compared with other unit panels 12 having lateral lengths equal to or greater than a lateral length of the unit panel 12f (the unit panels 12c, 12d, and 12e in this embodiment). Therefore, the strength of the unit panel 12f is reduced as compared with the unit panels 12c, 12d, and 12e, and the weight thereof per unit area (for example, 100 cm$^2$) is reduced as compared with the unit panels 12c, 12d, and 12e. Specifically, the unit panel 12f includes a smaller number of the ribs 24 per unit length (for example, 10 cm) in the lateral direction than the unit panel 12c (12d, 12e). Further, the lateral thickness $TRf$ of the rib 24 of the unit panel 12f is thinner than the lateral thickness $TRc$ of the rib 24 of the unit panel 12c (12d, 12e) (a relationship of $TRf<TRc$ is established). Further, the vertical thickness $TUf$ of the upper wall 22 of the unit panel 12f is thinner than the vertical thickness $TUc$ of the upper wall 22 of the unit panel 12c (12d, 12e) (a relationship of $TUf<TUc$ is established). Further, the vertical thicknesses $TLAf$ and $TLBf$ of the lower wall 20 of the unit panel 12f are thinner than the vertical thicknesses $TLAc$ and $TLBc$ of the lower wall 20 of the unit panel 12c (12d, 12e), respectively (a relationship of $TLAf<TLAc$ and $TLBf<TLBc$ is established).

In this embodiment, as described above, the unit panel 12f includes a smaller number of the ribs 24 per unit length in the lateral direction as compared with the unit panel 12c (12d, 12e), and the thicknesses of the ribs 24, the upper wall 22, and the lower wall 20 are reduced. However, as long as the weight of the unit panel 12f per unit area is lighter than that of the unit panel 12c (12d, 12e), an embodiment in which one to three of these is implemented may be adopted.

As described above, the unit panel 12f that is less likely to bend is not excessively reinforced by adopting a different structure from that of the unit panel 12c (12d, 12e) that is likely to bend, so that the weight of the unit panel 12f per unit area can be reduced.

Further, the unit panel 12f of which the right side is supported by the support portion 82 of the floor member 70 is less likely to bend when a load is applied from above the floor panel 10 as compared with the unit panel 12a including the free side 11. Since the unit panel 12a is located at the entrance and serves as a landing point when a person jumps into the vehicle, a large load is easily applied and the unit panel 12a easily bends. However, such load is less likely to be applied to the unit panel 12f. Therefore, the strength of the unit panel 12f is lower than that of the unit panel 12a, and the weight of the unit panel 12f per unit area (for example, 100 cm$^2$) is lighter than that of the unit panel 12a. Specifically, the lateral thickness $TRf$ of the rib 24 of the unit panel 12f is thinner than a lateral thickness TRa of the rib 24 of the unit panel 12a (a relationship of TRf<TRa is established). Further, the vertical thickness TUf of the upper wall 22 of the unit panel 12f is thinner than a vertical thickness TUa of the upper wall 22 of the unit panel 12a (a relationship of TUf<TUa is established). Further, the vertical thicknesses TLAf and TLBf of the lower wall 20 of the unit panel 12f are thinner than vertical thicknesses TLAa and TLBa of the lower wall 20 of the unit panel 12a, respectively (a relationship of TLAf<TLAa and TLBf<TLBa is established).

In this embodiment, as described above, in the unit panel 12f, the thicknesses of the ribs 24, the upper wall 22, and the lower wall 20 are reduced as compared with the unit panel 12a. However, as long as the weight of the unit panel 12f per unit area is lighter than that of the unit panel 12a, an embodiment in which one or two of these is implemented may be adopted. As described above, since the thicknesses of the ribs 24, the upper wall 22, and the lower wall 20 in the unit panel 12f are reduced as compared with the unit panel 12a, the weight of the unit panel 12f per unit area is lighter than that of the unit panel 12a.

According to the embodiment described above, the strength of the unit panel 12f that is less likely to bend when a load is applied from above the floor panel 10 is reduced and the weight thereof per unit area is reduced as compared with those of the unit panels 12a, 12c to 12e that are likely to bend. As a result, the weight of the entire floor panel can be reduced. Further, since the strengths of the unit panels 12a, 12c to 12e that are likely to bend are higher than that of the unit panel 12f, it is possible to suppress bending of the entire floor panel 10 and interference between the lower surface of the floor panel 10 and the electric-powered ramp equipment 6.

In the embodiment described above, one side of the floor panel 10 is the free side 11. However, an embodiment may be adopted in which a support member is added to the entrance of the vehicle 1, so that four sides of the floor panel 10 are supported by the floor member 70. In this case, the unit panel 12 of which left side is supported by the support member added to the entrance (corresponding to the above-mentioned unit panel 12a) is less likely to bend when a load is applied from above the unit panel 12. Therefore, in the unit panel 12 of which the left side is supported, the number of ribs per unit length in the lateral direction is reduced and the thicknesses of the ribs, the upper wall, and the lower wall are reduced as compared with the other unit panels having the lateral lengths equal to or greater than the lateral length of the unit panel 12, so that the weight of the unit panel 12 per unit area may be reduced. As a result, the weight of the entire floor panel 10 can be reduced.

The number, material, shape, and the like of the unit panels 12 constituting the floor panel 10 can be appropriately changed according to the specifications of the vehicle and the like.

What is claimed is:

1. A vehicle comprising:
   a ramp to facilitate egress and ingress in the vehicle; and
   a vehicle floor structure comprising:
      a floor member including an opening in which the ramp is provided; and
      a floor panel covering the opening, wherein:
      the floor panel is configured by sequentially arranging and integrating a plurality of kinds of unit panels in a lateral direction of the unit panels, the unit panels having rectangular shapes as viewed from above a vehicle;
      two end sides of the floor panel extending along a direction in which the unit panels are arranged and one side of at least one of two unit panels arranged at opposite ends of the floor panel are supported by the floor member; and
      a unit panel of which the one side is supported by the floor member has a lighter weight per unit area than other unit panels having lateral lengths equal to or greater than a lateral length of the unit panel,
      wherein the ramp is operable to protrude from the vehicle by moving outwardly relative to the vehicle floor structure.

2. The vehicle according to claim 1, wherein one side of another of the two unit panels arranged at the opposite ends of the floor panel is a free side that is not supported by the floor member.

3. The vehicle according to claim 2, wherein the unit panel of which the one side is supported by the floor member has a lighter weight per unit area than the unit panel including the free side.

4. The vehicle according to claim 3, wherein:
   each unit panel has a hollow plate shape and includes ribs that extend in a longitudinal direction of the unit panel inside the unit panel and connect an upper wall and a lower wall of a hollow cross section; and
   a rib of the unit panel of which the one side is supported by the floor member is thinner in the lateral direction of the unit panel than a rib of the unit panel including the free side.

5. The vehicle according to claim 1, wherein each unit panel has a hollow plate shape and includes ribs that extend in a longitudinal direction of the unit panel inside the unit panel and connect an upper wall and a lower wall of a hollow cross section.

6. The vehicle according to claim 5, wherein the unit panel of which the one side is supported by the floor member has a smaller number of the ribs per unit length in the lateral direction as compared with the other unit panels having the lateral lengths equal to or greater than the lateral length of the unit panel.

7. The vehicle according to claim 5, wherein a rib included in the unit panel of which the one side is supported by the floor member is thinner in the lateral direction of the unit panel than ribs of the other unit panels having the lateral lengths equal to or greater than the lateral length of the unit panel.

8. The vehicle according to claim 5, wherein:
   an inner side of the hollow cross section of each unit panel is divided into a plurality of chambers by one or more of the ribs;
   the chambers include a fastening chamber that includes the lower wall fastened to the floor member at longitudinal ends of the unit panel and an unfastening chamber that includes the lower wall that is not fastened to the floor member; and
   the lower wall of the unfastening chamber is thinner in a vehicle up-down direction than the lower wall of the fastening chamber.

9. The vehicle according to claim 1, wherein each unit panel is made of aluminum.

* * * * *